(12) United States Patent
Hinman

(10) Patent No.: US 10,742,275 B2
(45) Date of Patent: Aug. 11, 2020

(54) QUAD-SECTOR ANTENNA USING CIRCULAR POLARIZATION

(71) Applicant: Brian L. Hinman, Los Gatos, CA (US)

(72) Inventor: Brian L. Hinman, Los Gatos, CA (US)

(73) Assignee: Mimosa Networks, Inc., Santa Clara, CA (US)

( * ) Notice: Subject to any disclaimer, the term of this patent is extended or adjusted under 35 U.S.C. 154(b) by 694 days.

(21) Appl. No.: 14/198,473

(22) Filed: Mar. 5, 2014

(65) Prior Publication Data
US 2014/0253378 A1    Sep. 11, 2014

Related U.S. Application Data

(60) Provisional application No. 61/774,323, filed on Mar. 7, 2013.

(51) Int. Cl.
*H04B 7/0452*      (2017.01)
*H04B 7/10*        (2017.01)
(Continued)

(52) U.S. Cl.
CPC ........... *H04B 7/0452* (2013.01); *H01Q 11/08* (2013.01); *H01Q 21/08* (2013.01); *H01Q 21/205* (2013.01);
(Continued)

(58) Field of Classification Search
CPC ........ H04B 7/0452; H04B 7/10; H04B 7/022; H04B 7/024; H04B 7/04; H04B 7/0404; H04B 7/0408; H04B 7/0413; H04B 7/0491; H04B 7/0495; H01Q 11/08; H01Q 21/08; H01Q 21/205; H01Q 21/24; H01Q 21/28;
(Continued)

(56) References Cited

U.S. PATENT DOCUMENTS

| | | |
|---|---|---|
| 2,735,993 A | 2/1956 | Humphrey |
| 3,182,129 A | 5/1965 | Clark et al. |

(Continued)

FOREIGN PATENT DOCUMENTS

| | | |
|---|---|---|
| CN | 303453662 S | 11/2015 |
| CN | 105191204 | 12/2015 |

(Continued)

OTHER PUBLICATIONS

Final Office Action, dated Oct. 17, 2016, U.S. Appl. No. 14/639,976, filed Mar. 5, 2015.

(Continued)

*Primary Examiner* — Vladimir Magloire
*Assistant Examiner* — Nuzhat Pervin
(74) *Attorney, Agent, or Firm* — Carr & Ferrell LLP

(57) ABSTRACT

Systems and methods for providing a MIMO capable antenna with unique properties are provided herein. In some embodiments, a 4×4 MIMO capable antenna is provided with unique properties. Circular polarization from the antennas ensures that both vertical and horizontal polarizations are energized to the full extent provided by local regulations. A system includes a radio and a plurality of antennas coupled to the radio, the plurality of antennas servicing a broadcast area that has a 360 degree coverage area. Each of the plurality of antennas transmits and receives in an isolated sub-sector of the 360 degree coverage area.

3 Claims, 5 Drawing Sheets

(51) Int. Cl.
  *H01Q 21/08* (2006.01)
  *H01Q 11/08* (2006.01)
  *H01Q 21/20* (2006.01)
  *H01Q 21/28* (2006.01)
  *H01Q 21/24* (2006.01)

(52) U.S. Cl.
  CPC ............ *H01Q 21/24* (2013.01); *H01Q 21/28* (2013.01); *H04B 7/10* (2013.01)

(58) Field of Classification Search
  CPC .... H01Q 21/26; H01Q 21/065; H01Q 9/0414; H01Q 3/242; H01Q 9/0428; H01Q 1/246; H01Q 1/38; H01Q 19/026; H01Q 1/22; H01Q 25/002; H01Q 3/24; H01Q 21/02; H04W 16/00; H04W 88/08; H04W 84/12; G01S 7/023
  USPC .................................................. 342/361, 350
  See application file for complete search history.

(56) References Cited

U.S. PATENT DOCUMENTS

| | | | |
|---|---|---|---|
| D227,476 S | 6/1973 | Kennedy | |
| 4,188,633 A | 2/1980 | Frazita | |
| 4,402,566 A | 9/1983 | Powell et al. | |
| D273,111 S | 3/1984 | Hirata et al. | |
| 4,543,579 A | 9/1985 | Teshirogi | |
| 4,562,416 A | 12/1985 | Sedivec | |
| 4,626,863 A | 12/1986 | Knop et al. | |
| 4,835,538 A | 5/1989 | McKenna et al. | |
| 4,866,451 A * | 9/1989 | Chen | H01Q 9/0428 343/700 MS |
| 4,893,288 A | 1/1990 | Maier et al. | |
| 4,903,033 A * | 2/1990 | Tsao | H01Q 9/0414 343/700 MS |
| 4,986,764 A | 1/1991 | Eaby et al. | |
| 5,015,195 A | 5/1991 | Piriz | |
| 5,226,837 A | 7/1993 | Cinibulk et al. | |
| 5,231,406 A * | 7/1993 | Sreenivas | H01Q 21/24 343/700 MS |
| D346,598 S | 5/1994 | McCay et al. | |
| D355,416 S | 2/1995 | McCay et al. | |
| 5,389,941 A * | 2/1995 | Yu | H01Q 21/26 343/797 |
| 5,491,833 A * | 2/1996 | Hamabe | H04W 16/00 455/422.1 |
| 5,513,380 A | 4/1996 | Ivanov et al. | |
| 5,539,361 A | 7/1996 | Davidovitz | |
| 5,561,434 A | 10/1996 | Yamazaki | |
| D375,501 S | 11/1996 | Lee et al. | |
| 5,580,264 A | 12/1996 | Aoyama et al. | |
| 5,684,495 A | 11/1997 | Dyott et al. | |
| D389,575 S | 1/1998 | Grasfield et al. | |
| 5,724,666 A * | 3/1998 | Dent | H01Q 1/246 455/562.1 |
| 5,742,911 A * | 4/1998 | Dumbrill | H04B 7/0491 455/562.1 |
| 5,746,611 A | 5/1998 | Brown et al. | |
| 5,764,696 A * | 6/1998 | Barnes | H04B 7/10 370/205 |
| 5,797,083 A | 8/1998 | Anderson | |
| 5,831,582 A * | 11/1998 | Muhlhauser | H01Q 21/0037 343/753 |
| 5,966,102 A * | 10/1999 | Runyon | H01Q 1/246 343/797 |
| 5,995,063 A | 11/1999 | Somoza et al. | |
| 6,014,372 A | 1/2000 | Kent et al. | |
| 6,067,053 A | 5/2000 | Runyon et al. | |
| 6,137,449 A | 10/2000 | Kildal | |
| 6,140,962 A * | 10/2000 | Groenenboom | G01S 7/023 342/372 |
| 6,176,739 B1 | 1/2001 | Denlinger et al. | |
| 6,216,266 B1 | 4/2001 | Eastman et al. | |
| 6,271,802 B1 * | 8/2001 | Clark | G01J 5/0837 343/895 |
| 6,304,762 B1 * | 10/2001 | Myers | H04W 88/08 455/562.1 |
| D455,735 S | 4/2002 | Winslow | |
| 6,421,538 B1 | 7/2002 | Byrne | |
| 6,716,063 B1 | 4/2004 | Bryant et al. | |
| 6,754,511 B1 | 6/2004 | Halford et al. | |
| 6,847,653 B1 | 1/2005 | Smiroldo | |
| D501,848 S | 2/2005 | Uehara et al. | |
| 6,853,336 B2 | 2/2005 | Asano et al. | |
| 6,864,837 B2 | 3/2005 | Runyon et al. | |
| 6,877,277 B2 | 4/2005 | Kussel et al. | |
| 6,962,445 B2 | 11/2005 | Zimmel et al. | |
| 7,075,492 B1 | 7/2006 | Chen et al. | |
| D533,899 S | 12/2006 | Ohashi et al. | |
| 7,173,570 B1 * | 2/2007 | Wensink | H01Q 1/125 343/760 |
| 7,187,328 B2 | 3/2007 | Tanaka et al. | |
| 7,193,562 B2 * | 3/2007 | Shtrom | H01Q 9/16 343/700 MS |
| 7,212,162 B2 | 5/2007 | Jung et al. | |
| 7,212,163 B2 * | 5/2007 | Huang | H01Q 19/026 343/700 MS |
| 7,245,265 B2 | 7/2007 | Kienzle et al. | |
| 7,253,783 B2 * | 8/2007 | Chiang | H01Q 1/2258 343/757 |
| 7,264,494 B2 | 9/2007 | Kennedy et al. | |
| 7,281,856 B2 | 10/2007 | Grzegorzewska et al. | |
| 7,292,198 B2 * | 11/2007 | Shtrom | H01Q 1/38 343/795 |
| 7,306,485 B2 | 12/2007 | Masuzaki | |
| 7,316,583 B1 | 1/2008 | Mistarz | |
| 7,324,057 B2 | 1/2008 | Argaman et al. | |
| D566,698 S | 4/2008 | Choi et al. | |
| 7,362,236 B2 | 4/2008 | Hoiness | |
| 7,369,095 B2 | 5/2008 | Hirtzlin et al. | |
| 7,380,984 B2 | 6/2008 | Wuester | |
| 7,431,602 B2 | 10/2008 | Corona | |
| 7,498,896 B2 | 3/2009 | Shi | |
| 7,498,996 B2 * | 3/2009 | Shtrom | H01Q 3/24 343/795 |
| 7,507,105 B1 | 3/2009 | Peters et al. | |
| 7,522,095 B1 | 4/2009 | Wasiewicz et al. | |
| 7,542,717 B2 | 6/2009 | Green, Sr. et al. | |
| 7,581,976 B2 | 9/2009 | Liepold et al. | |
| 7,586,891 B1 | 9/2009 | Masciulli | |
| 7,616,959 B2 | 11/2009 | Spenik et al. | |
| 7,646,343 B2 * | 1/2010 | Shtrom | H01Q 3/242 343/700 MS |
| 7,675,473 B2 | 3/2010 | Kienzle et al. | |
| 7,675,474 B2 * | 3/2010 | Shtrom | H01Q 3/242 343/700 MS |
| 7,726,997 B2 | 6/2010 | Kennedy et al. | |
| 7,778,226 B2 | 8/2010 | Rayzman et al. | |
| 7,857,523 B2 | 12/2010 | Masuzaki | |
| 7,929,914 B2 | 4/2011 | Tegreene | |
| RE42,522 E | 7/2011 | Zimmel et al. | |
| 8,009,646 B2 * | 8/2011 | Lastinger | H04B 7/0413 370/338 |
| 8,069,465 B1 | 11/2011 | Bartholomay et al. | |
| 8,111,678 B2 * | 2/2012 | Lastinger | H04B 17/15 370/338 |
| 8,254,844 B2 * | 8/2012 | Kuffner | H04B 7/10 455/454 |
| 8,270,383 B2 * | 9/2012 | Lastinger | H04B 7/024 370/338 |
| 8,275,265 B2 | 9/2012 | Kobyakov et al. | |
| 8,325,695 B2 * | 12/2012 | Lastinger | H04B 7/024 370/338 |
| D674,787 S | 1/2013 | Tsuda et al. | |
| 8,345,651 B2 * | 1/2013 | Lastinger | H04B 17/15 370/338 |
| 8,385,305 B1 * | 2/2013 | Negus | H04J 1/00 370/338 |
| 8,425,260 B2 | 4/2013 | Seefried et al. | |
| 8,482,478 B2 * | 7/2013 | Hartenstein | H01Q 21/24 343/700 MS |

(56) References Cited

U.S. PATENT DOCUMENTS

| | | | |
|---|---|---|---|
| 8,515,434 B1 | 8/2013 | Narendran et al. | |
| 8,515,495 B2* | 8/2013 | Shang | H01Q 3/24 455/561 |
| D694,740 S | 12/2013 | Apostolakis | |
| 8,777,660 B2 | 7/2014 | Chiarelli et al. | |
| 8,792,759 B2 | 7/2014 | Benton et al. | |
| 8,827,729 B2 | 9/2014 | Gunreben et al. | |
| 8,836,601 B2 | 9/2014 | Sanford et al. | |
| 8,848,389 B2 | 9/2014 | Kawamura et al. | |
| 8,870,069 B2* | 10/2014 | Bellows | G01S 1/74 235/375 |
| 8,935,122 B2 | 1/2015 | Stisser | |
| 9,001,689 B1 | 4/2015 | Hinman et al. | |
| 9,019,874 B2 | 4/2015 | Choudhury et al. | |
| 9,077,071 B2* | 7/2015 | Shtrom | H01Q 9/285 |
| 9,107,134 B1 | 8/2015 | Belser et al. | |
| 9,130,305 B2 | 9/2015 | Ramos et al. | |
| 9,161,387 B2 | 10/2015 | Fink et al. | |
| 9,179,336 B2 | 11/2015 | Fink et al. | |
| 9,191,081 B2 | 11/2015 | Hinman et al. | |
| D752,566 S | 3/2016 | Hinman et al. | |
| 9,295,103 B2 | 3/2016 | Fink et al. | |
| 9,362,629 B2 | 6/2016 | Hinman et al. | |
| 9,391,375 B1* | 7/2016 | Bales | H01Q 21/24 |
| 9,407,012 B2* | 8/2016 | Shtrom | H01Q 9/26 |
| 9,431,702 B2* | 8/2016 | Hartenstein | H04B 7/0617 |
| 9,504,049 B2 | 11/2016 | Hinman et al. | |
| 9,531,114 B2 | 12/2016 | Ramos et al. | |
| 9,537,204 B2* | 1/2017 | Cheng | H01Q 1/38 |
| 9,577,340 B2 | 2/2017 | Fakharzadeh et al. | |
| 9,693,388 B2 | 6/2017 | Fink et al. | |
| 9,780,892 B2 | 10/2017 | Hinman et al. | |
| 9,843,940 B2 | 12/2017 | Hinman et al. | |
| 9,871,302 B2 | 1/2018 | Hinman et al. | |
| 9,888,485 B2 | 2/2018 | Hinman et al. | |
| 9,930,592 B2 | 3/2018 | Hinman | |
| 9,949,147 B2 | 4/2018 | Hinman et al. | |
| 9,986,565 B2 | 5/2018 | Fink et al. | |
| 9,998,246 B2 | 6/2018 | Hinman et al. | |
| 10,028,154 B2 | 7/2018 | Elson | |
| 10,090,943 B2 | 10/2018 | Hinman et al. | |
| 10,096,933 B2 | 10/2018 | Ramos et al. | |
| 10,117,114 B2 | 10/2018 | Hinman et al. | |
| 10,186,786 B2 | 1/2019 | Hinman et al. | |
| 10,200,925 B2 | 2/2019 | Hinman | |
| 10,257,722 B2 | 4/2019 | Hinman et al. | |
| 10,425,944 B2 | 9/2019 | Fink et al. | |
| 10,447,417 B2 | 10/2019 | Hinman et al. | |
| 10,511,074 B2 | 12/2019 | Eberhardt et al. | |
| 10,595,253 B2 | 3/2020 | Hinman | |
| 10,616,903 B2 | 4/2020 | Hinman et al. | |
| 2001/0033600 A1* | 10/2001 | Yang | H01Q 1/246 375/130 |
| 2002/0102948 A1 | 8/2002 | Stanwood et al. | |
| 2002/0159434 A1 | 10/2002 | Gosior et al. | |
| 2003/0013452 A1 | 1/2003 | Hunt et al. | |
| 2003/0027577 A1 | 2/2003 | Brown et al. | |
| 2003/0169763 A1 | 9/2003 | Choi et al. | |
| 2003/0222831 A1* | 12/2003 | Dunlap | H01Q 1/246 343/893 |
| 2003/0224741 A1 | 12/2003 | Sugar et al. | |
| 2004/0002357 A1 | 1/2004 | Benveniste | |
| 2004/0029549 A1 | 2/2004 | Fikart | |
| 2004/0110469 A1 | 6/2004 | Judd et al. | |
| 2004/0120277 A1 | 6/2004 | Holur et al. | |
| 2004/0155819 A1 | 8/2004 | Martin et al. | |
| 2004/0196812 A1 | 10/2004 | Barber | |
| 2004/0196813 A1* | 10/2004 | Ofek | H01Q 1/246 370/334 |
| 2004/0240376 A1 | 12/2004 | Wang et al. | |
| 2004/0242274 A1* | 12/2004 | Corbett | H01Q 1/242 455/562.1 |
| 2005/0012665 A1 | 1/2005 | Runyon et al. | |
| 2005/0032479 A1 | 2/2005 | Miller et al. | |
| 2005/0058111 A1* | 3/2005 | Hung | H04W 84/12 370/338 |
| 2005/0124294 A1 | 6/2005 | Wentink | |
| 2005/0143014 A1 | 6/2005 | Li et al. | |
| 2005/0195758 A1 | 9/2005 | Chitrapu | |
| 2005/0227625 A1 | 10/2005 | Diener | |
| 2005/0254442 A1 | 11/2005 | Proctor, Jr. et al. | |
| 2005/0271056 A1 | 12/2005 | Kaneko | |
| 2005/0275527 A1 | 12/2005 | Kates | |
| 2006/0025072 A1 | 2/2006 | Pan | |
| 2006/0072518 A1 | 4/2006 | Pan et al. | |
| 2006/0098592 A1 | 5/2006 | Proctor, Jr. et al. | |
| 2006/0099940 A1 | 5/2006 | Pfleging et al. | |
| 2006/0132359 A1* | 6/2006 | Chang | H01Q 9/0428 343/700 MS |
| 2006/0132602 A1 | 6/2006 | Muto et al. | |
| 2006/0172578 A1 | 8/2006 | Parsons | |
| 2006/0187952 A1 | 8/2006 | Kappes et al. | |
| 2006/0211430 A1 | 9/2006 | Persico | |
| 2006/0276073 A1 | 12/2006 | McMurray et al. | |
| 2007/0001910 A1 | 1/2007 | Yamanaka et al. | |
| 2007/0019664 A1 | 1/2007 | Benveniste | |
| 2007/0035463 A1 | 2/2007 | Hirabayashi | |
| 2007/0060158 A1 | 3/2007 | Medepalli et al. | |
| 2007/0132643 A1 | 6/2007 | Durham et al. | |
| 2007/0173199 A1 | 7/2007 | Sinha | |
| 2007/0173260 A1 | 7/2007 | Love et al. | |
| 2007/0202809 A1 | 8/2007 | Lastinger et al. | |
| 2007/0210974 A1* | 9/2007 | Chiang | H01Q 19/32 343/757 |
| 2007/0223701 A1 | 9/2007 | Emeott et al. | |
| 2007/0238482 A1 | 10/2007 | Rayzman et al. | |
| 2007/0255797 A1 | 11/2007 | Dunn et al. | |
| 2007/0268848 A1 | 11/2007 | Khandekar et al. | |
| 2008/0109051 A1 | 5/2008 | Splinter et al. | |
| 2008/0112380 A1 | 5/2008 | Fischer | |
| 2008/0192707 A1 | 8/2008 | Xhafa et al. | |
| 2008/0218418 A1 | 9/2008 | Gillette | |
| 2008/0231541 A1 | 9/2008 | Teshirogi et al. | |
| 2008/0242342 A1 | 10/2008 | Rofougaran | |
| 2009/0046673 A1 | 2/2009 | Kaidar | |
| 2009/0052362 A1 | 2/2009 | Meier et al. | |
| 2009/0059794 A1 | 3/2009 | Frei | |
| 2009/0075606 A1* | 3/2009 | Shtrom | H01Q 3/242 455/101 |
| 2009/0096699 A1 | 4/2009 | Chiu et al. | |
| 2009/0232026 A1 | 9/2009 | Lu | |
| 2009/0233475 A1 | 9/2009 | Mildon et al. | |
| 2009/0291690 A1 | 11/2009 | Guvenc et al. | |
| 2009/0315792 A1 | 12/2009 | Miyashita et al. | |
| 2010/0029282 A1 | 2/2010 | Stamoulis et al. | |
| 2010/0039340 A1* | 2/2010 | Brown | F41A 33/02 343/756 |
| 2010/0046650 A1 | 2/2010 | Jongren et al. | |
| 2010/0067505 A1 | 3/2010 | Fein et al. | |
| 2010/0085950 A1 | 4/2010 | Sekiya et al. | |
| 2010/0091818 A1 | 4/2010 | Sen et al. | |
| 2010/0103065 A1 | 4/2010 | Shtrom et al. | |
| 2010/0103066 A1 | 4/2010 | Shtrom et al. | |
| 2010/0136978 A1 | 6/2010 | Cho et al. | |
| 2010/0151877 A1 | 6/2010 | Lee et al. | |
| 2010/0167719 A1 | 7/2010 | Sun | |
| 2010/0171665 A1 | 7/2010 | Nogami | |
| 2010/0171675 A1 | 7/2010 | Borja et al. | |
| 2010/0189005 A1 | 7/2010 | Bertani et al. | |
| 2010/0202613 A1 | 8/2010 | Ray et al. | |
| 2010/0210147 A1 | 8/2010 | Hauser | |
| 2010/0216412 A1 | 8/2010 | Rofougaran | |
| 2010/0225529 A1* | 9/2010 | Landreth | G01S 7/03 342/175 |
| 2010/0238083 A1 | 9/2010 | Malasani | |
| 2010/0304680 A1* | 12/2010 | Kuffner | H04B 7/10 455/63.1 |
| 2010/0311321 A1* | 12/2010 | Norin | H04N 21/6131 455/3.02 |
| 2010/0315307 A1 | 12/2010 | Syed et al. | |
| 2010/0322219 A1 | 12/2010 | Fischer et al. | |
| 2011/0006956 A1 | 1/2011 | McCown | |

(56) References Cited

U.S. PATENT DOCUMENTS

| | | |
|---|---|---|
| 2011/0028097 A1 | 2/2011 | Memik et al. |
| 2011/0032159 A1 | 2/2011 | Wu et al. |
| 2011/0044186 A1 | 2/2011 | Jung et al. |
| 2011/0090129 A1 | 4/2011 | Weily et al. |
| 2011/0103309 A1 | 5/2011 | Wang et al. |
| 2011/0111715 A1 | 5/2011 | Buer et al. |
| 2011/0112717 A1 | 5/2011 | Resner |
| 2011/0133996 A1* | 6/2011 | Alapuranen ........... H01Q 21/28 343/702 |
| 2011/0170424 A1 | 7/2011 | Safavi |
| 2011/0172916 A1 | 7/2011 | Pakzad et al. |
| 2011/0182260 A1 | 7/2011 | Sivakumar et al. |
| 2011/0182277 A1 | 7/2011 | Shapira |
| 2011/0194644 A1 | 8/2011 | Liu et al. |
| 2011/0206012 A1 | 8/2011 | Youn et al. |
| 2011/0241969 A1 | 10/2011 | Zhang et al. |
| 2011/0243291 A1 | 10/2011 | McAllister et al. |
| 2011/0256874 A1 | 10/2011 | Hayama et al. |
| 2011/0291914 A1 | 12/2011 | Lewry et al. |
| 2012/0008542 A1 | 1/2012 | Koleszar et al. |
| 2012/0040700 A1 | 2/2012 | Gomes et al. |
| 2012/0057533 A1 | 3/2012 | Junell et al. |
| 2012/0093091 A1 | 4/2012 | Kang et al. |
| 2012/0115487 A1 | 5/2012 | Josso |
| 2012/0134280 A1 | 5/2012 | Rotvold et al. |
| 2012/0140651 A1 | 6/2012 | Nicoara et al. |
| 2012/0238201 A1 | 9/2012 | Du et al. |
| 2012/0263145 A1 | 10/2012 | Marinier et al. |
| 2012/0282868 A1 | 11/2012 | Hahn |
| 2012/0299789 A1 | 11/2012 | Orban et al. |
| 2012/0314634 A1 | 12/2012 | Sekhar |
| 2013/0003645 A1 | 1/2013 | Shapira et al. |
| 2013/0005350 A1 | 1/2013 | Campos et al. |
| 2013/0023216 A1 | 1/2013 | Moscibroda et al. |
| 2013/0044028 A1* | 2/2013 | Lea ........................ H01Q 21/24 342/359 |
| 2013/0064161 A1 | 3/2013 | Hedayat et al. |
| 2013/0082899 A1 | 4/2013 | Gomi |
| 2013/0095747 A1 | 4/2013 | Moshfeghi |
| 2013/0128858 A1 | 5/2013 | Zou et al. |
| 2013/0176902 A1 | 7/2013 | Wentink et al. |
| 2013/0182652 A1 | 7/2013 | Tong et al. |
| 2013/0195081 A1 | 8/2013 | Merlin et al. |
| 2013/0210457 A1 | 8/2013 | Kummetz |
| 2013/0223398 A1 | 8/2013 | Li |
| 2013/0234898 A1 | 9/2013 | Leung et al. |
| 2013/0271319 A1 | 10/2013 | Trerise |
| 2013/0286950 A1 | 10/2013 | Pu |
| 2013/0286959 A1 | 10/2013 | Lou et al. |
| 2013/0288735 A1 | 10/2013 | Guo |
| 2013/0301438 A1 | 11/2013 | Li et al. |
| 2013/0322276 A1 | 12/2013 | Pelletier et al. |
| 2013/0322413 A1 | 12/2013 | Pelletier et al. |
| 2014/0024328 A1 | 1/2014 | Balbien et al. |
| 2014/0051357 A1 | 2/2014 | Steer et al. |
| 2014/0098748 A1 | 4/2014 | Chan et al. |
| 2014/0113676 A1 | 4/2014 | Hamalainen et al. |
| 2014/0145890 A1 | 5/2014 | Ramberg et al. |
| 2014/0154895 A1 | 6/2014 | Poulsen et al. |
| 2014/0185494 A1 | 7/2014 | Yang et al. |
| 2014/0191918 A1 | 7/2014 | Cheng et al. |
| 2014/0198867 A1 | 7/2014 | Sturkovich et al. |
| 2014/0206322 A1 | 7/2014 | Dimou et al. |
| 2014/0225788 A1 | 8/2014 | Schulz et al. |
| 2014/0233613 A1 | 8/2014 | Fink et al. |
| 2014/0235244 A1 | 8/2014 | Hinman |
| 2014/0253402 A1 | 9/2014 | Hinman et al. |
| 2014/0254700 A1 | 9/2014 | Hinman et al. |
| 2014/0256166 A1 | 9/2014 | Ramos et al. |
| 2014/0320306 A1 | 10/2014 | Winter |
| 2014/0320377 A1 | 10/2014 | Cheng et al. |
| 2014/0328238 A1 | 11/2014 | Seok et al. |
| 2014/0355578 A1 | 12/2014 | Fink et al. |
| 2014/0355584 A1 | 12/2014 | Fink et al. |
| 2015/0002335 A1* | 1/2015 | Hinman ................ H01Q 11/08 342/365 |
| 2015/0002354 A1 | 1/2015 | Knowles |
| 2015/0015435 A1 | 1/2015 | Shen et al. |
| 2015/0116177 A1 | 4/2015 | Powell et al. |
| 2015/0156642 A1 | 6/2015 | Sobczak et al. |
| 2015/0215952 A1 | 7/2015 | Hinman et al. |
| 2015/0256275 A1 | 9/2015 | Hinman et al. |
| 2015/0263816 A1 | 9/2015 | Hinman et al. |
| 2015/0319584 A1 | 11/2015 | Fink et al. |
| 2015/0321017 A1 | 11/2015 | Perryman et al. |
| 2015/0325945 A1 | 11/2015 | Ramos et al. |
| 2015/0327272 A1 | 11/2015 | Fink et al. |
| 2015/0365866 A1 | 12/2015 | Hinman et al. |
| 2016/0119018 A1 | 4/2016 | Lindgren et al. |
| 2016/0149634 A1* | 5/2016 | Kalkunte ............. H04B 7/1555 375/267 |
| 2016/0149635 A1 | 5/2016 | Hinman et al. |
| 2016/0211583 A1 | 7/2016 | Lee et al. |
| 2016/0240929 A1 | 8/2016 | Hinman et al. |
| 2016/0338076 A1 | 11/2016 | Hinman et al. |
| 2016/0365666 A1 | 12/2016 | Ramos et al. |
| 2016/0366601 A1 | 12/2016 | Hinman et al. |
| 2017/0048647 A1 | 2/2017 | Jung et al. |
| 2017/0201028 A1 | 7/2017 | Eberhardt et al. |
| 2017/0238151 A1 | 8/2017 | Fink et al. |
| 2017/0294975 A1 | 10/2017 | Hinman et al. |
| 2018/0034166 A1 | 2/2018 | Hinman |
| 2018/0035317 A1 | 2/2018 | Hinman et al. |
| 2018/0083365 A1 | 3/2018 | Hinman et al. |
| 2018/0084563 A1 | 3/2018 | Hinman et al. |
| 2018/0160353 A1 | 6/2018 | Hinman |
| 2018/0192305 A1 | 7/2018 | Hinman et al. |
| 2018/0199345 A1 | 7/2018 | Fink et al. |
| 2018/0241491 A1 | 8/2018 | Hinman et al. |
| 2019/0006789 A1 | 1/2019 | Ramos et al. |
| 2019/0182686 A1 | 6/2019 | Hinman et al. |
| 2019/0214699 A1 | 7/2019 | Eberhardt et al. |
| 2019/0215745 A1 | 7/2019 | Hinman |
| 2019/0273326 A1 | 9/2019 | Sanford et al. |
| 2020/0015231 A1 | 1/2020 | Fink et al. |
| 2020/0036465 A1 | 1/2020 | Hinman et al. |
| 2020/0067164 A1 | 2/2020 | Eberhardt et al. |
| 2020/0083614 A1 | 3/2020 | Sanford et al. |

FOREIGN PATENT DOCUMENTS

| | | |
|---|---|---|
| CN | 105191204 B | 5/2019 |
| EP | 002640177 | 2/2015 |
| EP | 3491697 A1 | 6/2019 |
| WO | WO2014137370 | 9/2014 |
| WO | WO2014138292 | 9/2014 |
| WO | WO2014193394 | 12/2014 |
| WO | WO2015112627 | 7/2015 |
| WO | WO2017123558 A1 | 7/2017 |
| WO | WO2018022526 A1 | 2/2018 |
| WO | WO2019136257 A1 | 7/2019 |
| WO | WO2019168800 A1 | 9/2019 |

OTHER PUBLICATIONS

Non-Final Office Action, dated Oct. 26, 2016, U.S. Appl. No. 15/139,225, filed Apr. 26, 2016.

Notice of Allowance, dated Jul. 26, 2016, U.S. Appl. No. 14/325,307, filed Jul. 7, 2014.

Notice of Allowance, dated Aug. 16, 2016, U.S. Appl. No. 14/802,829, filed Jul. 17, 2015.

International Search Report and Written Opinion of the International Search Authority dated Jul. 1, 2014 in Patent Cooperation Treaty Application No. PCT/US2014/020880, filed Mar. 5, 2014.

Non-Final Office Action, dated Sep. 15, 2016, U.S. Appl. No. 14/183,375, filed Feb. 18, 2014.

Non-Final Office Action, dated Sep. 30, 2016, U.S. Appl. No. 14/657,942, filed Mar. 13, 2015.

Final Office Action, dated Oct. 12, 2016, U.S. Appl. No. 14/741,423, filed Jun. 16, 2015.

(56) References Cited

OTHER PUBLICATIONS

"International Search Report" and "Written Opinion of the International Search Authority," dated May 23, 2019 in Patent Cooperation Treaty Application No. PCT/US2019/019462, filed Feb. 25, 2019, 8 pages.
Teshirogi, Tasuku et al., "Wideband Circularly Polarized Array Antenna with Sequential Rotations and Phase Shift of Elements," Proceedings of the International Symposium on Antennas and Propagation, 1985, pp. 117-120.
"Sector Antennas," Radiowaves.com, [online], [retrieved Oct. 10, 2019], Retrieved from the Internet: <URL:https://www.radiowaves.com/en/products/sector-antennas>, 4 pages.
KP Performance Antennas Search Results for Antennas, Sector, Single, [online], KPPerformance.com [retrieved Oct. 10, 2019], Retrieved from the Internet: <URL:https://www.kpperformance.com/search?Category=Antennas&Rfpsan99design=Sector&Rfpsan99option=Single&view_type=grid>, 6 pages.
Notice of Allowance dated Sep. 8, 2015 in Chinese Design Patent Application 201530058063.8, filed Mar. 11, 2015.
"Notice of Allowance," Chinese Patent Application No. 201580000078.6, dated Feb. 11, 2019, 2 pages.
"International Search Report" and "Written Opinion of the International Search Authority," dated Mar. 22, 2019 in Patent Cooperation Treaty Application No. PCT/US2019/012358, filed Jan. 4, 2019, 9 pages.
FCC Regulations, 47 CFR § 15.407, 63 FR 40836, Jul. 31, 1998, as amended at 69 FR 2687, Jan. 20, 2004; 69 FR 54036, Sep. 7, 2004; pp. 843-846.
Weisstein, Eric, "Electric Polarization", Wolfram Reasearch [online], Retrieved from the Internet [retrieved Mar. 23, 2017] <URL:http://scienceworld.wolfram.com/physics/ElectricPolarization.html>, 2007, 1 page.
Liu, Lingjia et al., "Downlink MIMO in LTE-Advanced: SU-MIMO vs. MU-MIMO," IEEE Communications Magazine, Feb. 2012, pp. 140-147.
"International Search Report" and "Written Opinion of the International Searching Authority," Patent Cooperation Treaty Application No. PCT/US2017/012884, dated Apr. 6, 2017, 9 pages.
International Search Report and Written Opinion of the International Search Authority dated Nov. 26, 2013 in Patent Cooperation Treaty Application No. PCT/US2013/047406, filed Jun. 24, 2013.
International Search Report and Written Opinion of the International Search Authority dated Aug. 9, 2013 in Patent Cooperation Treaty Application No. PCT/US2013/043436, filed May 30, 2013.
"Office Action," Chinese Patent Application No. 201580000078.6, dated Nov. 3, 2017, 5 pages [10 pages including translation].
"International Search Report" and "Written Opinion of the International Searching Authority," Patent Cooperation Treaty Application No. PCT/US2017/043560, dated Nov. 16, 2017, 11 pages.
International Search Report and Written Opinion of the International Search Authority dated Jun. 29, 2015 in Patent Cooperation Treaty Application No. PCT/US2015/012285, filed Jan. 21, 2015.
Hinman et al., U.S. Appl. No. 61/774,632, filed Mar. 7, 2013.
First Official Notification dated Jun. 15, 2015 in Chinese Design Patent Application 201530058063.8, filed Mar. 11, 2015.
"Office Action," Chinese Patent Application No. 201580000078.6, dated Jul. 30, 2018, 5 pages [11 pages including translation].
"Office Action," Chinese Patent Application No. 201580000078.6, dated Oct. 31, 2018, 3 pages [6 pages including translation].
"Partial Supplemental European Search Report," European Patent Application No. 17835073.2, dated Feb. 13, 2020, 17 pages.
"Wireless Access Point," Wikipedia.org, Jan. 6, 2020 [retrieved on Feb. 3, 2020], Retrieved from the Internet: <https://en.wikipedia.org/wiki/Wireless_access_point>, 5 pages.

* cited by examiner

QUAD-SECTOR ANTENNA USING CIRCULAR POLARIZATION

CROSS REFERENCE TO RELATED APPLICATIONS

This application claims the priority benefit of U.S. Provisional Application No. 61/774,323, filed on Mar. 7, 2013, which is hereby incorporated by reference herein in its entirety including all reference cited therein.

FIELD OF THE INVENTION

The present technology is generally described as providing quad-sector antenna that use circular polarization. According to some embodiments, the present technology is directed to systems and methods for providing a MIMO capable antenna with unique properties. In some embodiments, a 4×4 MIMO capable antenna is provided with unique properties. The use of circular polarization by the antennas ensures that both vertical and horizontal polarizations are energized to the full extent provided by local regulations.

BACKGROUND

MIMO systems in general utilize multiple antennas at both the transmitter and receiver to improve communication performance. While not necessarily scaling linearly with antenna count, MIMO systems allow for the communication of different information on each of a plurality of antennas, generally using the same frequency, allowing a new dimension of scalability in high throughput communication. These MIMO systems exploit the use of spatial, polarization, time and/or frequency diversity to achieve orthogonality between multiple data streams transmitted simultaneously. Advanced downlink multi-user MIMO (MU-MIMO) systems takes advantage of the potential orthogonality between distinct receivers, allowing a single transmitter node to communicate with multiple receiver nodes simultaneously, sending unique data streams per receiver. Uplink MU-MIMO systems are also possible, whereby multiple nodes can simultaneously send unique streams to one or more other nodes. Exemplary systems that utilize MIMO technology include, but are not limited to, Wi-Fi networks, wireless Internet service providers (ISP), worldwide interoperability for microwave access (WiMAX) systems, and 4G long-term evolution (LTE) data transmission systems.

SUMMARY

In some embodiments, the present technology is directed to a MIMO system comprising: (a) a radio; and (b) at least four antennas coupled to the radio, the four antennas servicing a broadcast area that has a 360 degree coverage area, wherein each of the plurality of four antennas transmits and receives in an isolated sub-sector of the 360 degree coverage area.

In some embodiments, the present technology is directed to a MIMO system comprising: (a) a radio; and (b) at least four antennas coupled to the radio, the four antennas servicing a broadcast area that has a 360 degree coverage area, wherein each of the four antennas transmits and receives in a sub-sector of the 360 degree coverage area, wherein adjacent subsectors at least partially overlap one another.

In some embodiments, the present technology is directed to a MIMO system comprising: (a) a radio; and (b) a substrate comprising a plurality of antennas arranged in a linear pattern, each of the plurality of antennas producing a signal that of cardioid pattern, wherein a combination of signals of the plurality of antennas produce a 360 degree coverage area.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive is omitted. It will be understood that the technology is not necessarily limited to the particular embodiments illustrated herein.

DESCRIPTION OF EXEMPLARY EMBODIMENTS

Figure 1:
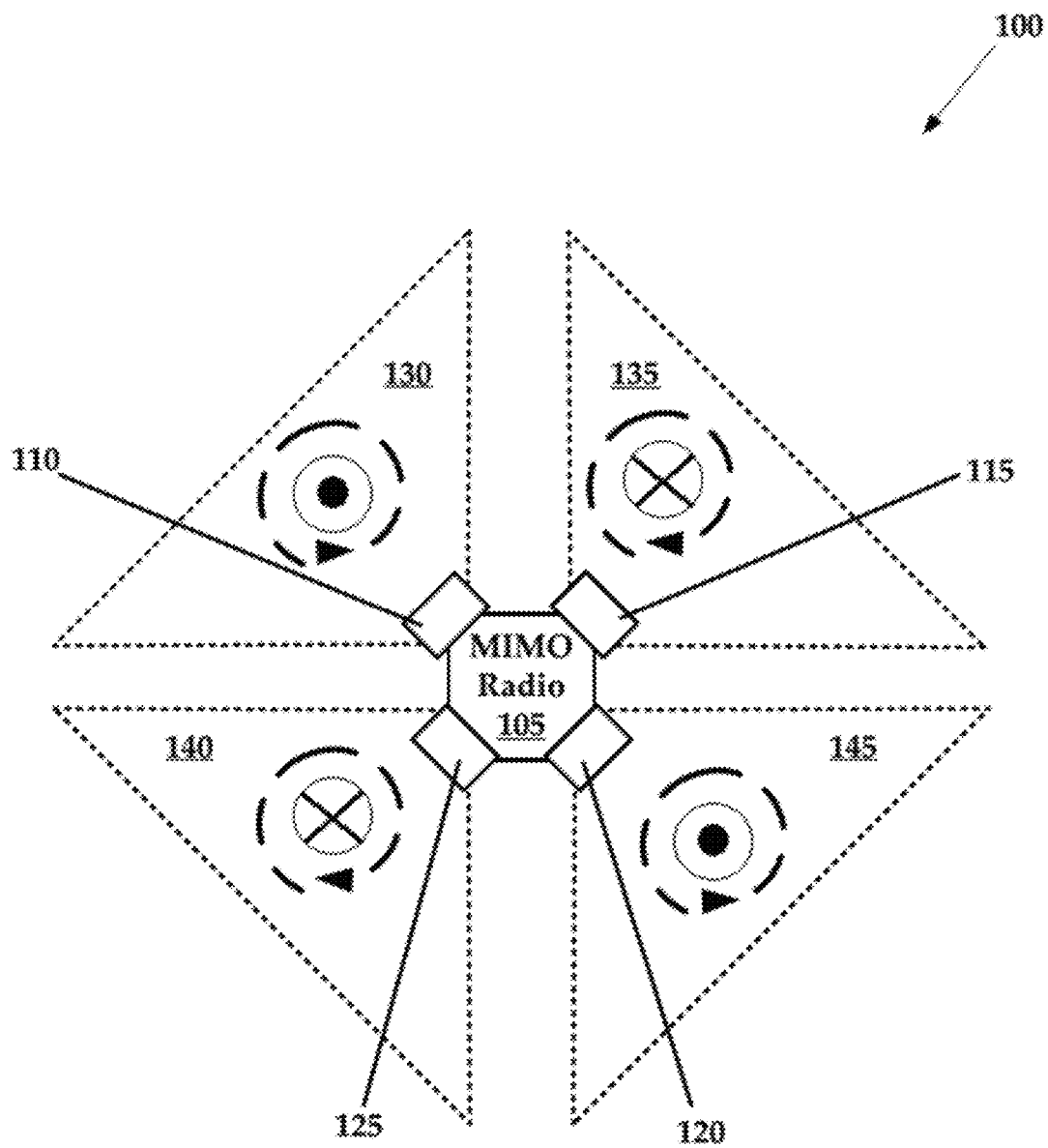
FIG. 1 is a schematic diagram of an exemplary MIMO system that is constructed in accordance with the present technology, having antennas that broadcast in a fixed and non-overlapping manner.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that like or analogous elements and/or components, referred to herein, is identified throughout the drawings with like reference characters. It will be further understood that several of the figures are merely schematic representations of the present technology. As such, some of the components may have been distorted from their actual scale for pictorial clarity.

In some embodiments, according to the present technology, four arrays of vertically aligned patch antennas provide a 4×4 multiple-input multiple-output (MIMO) capable antenna with unique properties. The circular polarization emitted from the antennas ensures that both vertical and horizontal polarizations are energized to the full extent permitted by local regulations. Alternating between right hand circular polarization (RHCP) and left hand circular polarization (LHCP) at 90-degree intervals facilitates 2×2 MIMO communication to remote clients provided that the azimuthal response of the arrays adequately overlap one another.

In general, circular polarization occurs when elements of an antenna produce an electromagnetic wave (e.g., generated field) that varies rotationally in a direction of propagation. More specifically, circular polarization is comprised of two orthogonal linear polarized waves which are 90 degrees out of phase.

In one embodiment this system operates as an access point (AP). Four channels are implemented in various configurations in some exemplary embodiments. In one access point embodiment, the four channels are connected to four high gain antennas pointed in four different directions. For example, each antenna is positioned facing outward at a 90 degree angle relative to adjacent antennae. A 360 degree pickup (e.g., coverage area) is achieved in this manner, where each antenna broadcasts in an approximately 90 degree coverage area. For example, first and third antennas are disposed 180 degrees out of phase relative to one another and second and fourth antennas are disposed 180 degrees out of phase relative to one another. Generally, the first, second, third, and fourth isolated sub-sectors each occupy approximately 90 degrees of the 360 degree coverage area.

In another access point embodiment, a linear array of elements is created. The linear array is implemented a series feed or a corporate feed using patches, discs, helical coils, etc. The cardioid pattern of the antennas crushes down the vertical axis, when arranged in a linear array, producing a donut pickup pattern that forms a broadcast/pickup area of approximately 360 degrees. Such a pattern is desirable for an access point, which services wireless devices located at any direction around the AP.

Another embodiment comprises a radio that is coupled to four antennas in order to achieve a 360 degree pickup. Thus, in some embodiments the system includes a four sector antenna with a radio combined. Coupling is performed with Ethernet and Power over Ethernet (POE), and the radio is run at one Gigabit/sec, for example.

For example, FIG. 1 illustrates an exemplary MIMO system 100 that comprises a plurality of circularly polarized antennas 110-125, where antenna broadcasts in a fixed direction over a coverage area.

The plurality of circularly polarized antennas 110-125 are coupled electrically and communicatively to a MIMO radio 105. The MIMO radio 105 controls the transmission and/or receiver scheduling for each of the plurality of circularly polarized antennas 110-125, as well as the data that is transmitted. In some embodiments, antenna 110 broadcasts in area 130, antenna 115 broadcasts in area 135, antenna 120 broadcasts in 145, and antenna 125 broadcasts in area 140.

In general, the MIMO radio 105 is configured to control antenna 110 such that it transmits signals using a first and distinct primary polarization, while antenna 115 transmits signals using a secondary polarization that is orthogonal to the primary polarization. Antenna 120 transmits signals using the primary polarization and antenna 125 transmits signals using the secondary polarization. Advantageously, the adjacent antennae coupled to the MIMO radio 105 alternate in their polarization, using either a primary or secondary polarization.

To be sure, each antenna can be categorized as having some angular orientation (e.g., vertical, horizontal, slant 45°, or other angle) as well as polarity of a particular type (e.g., linear, right circular or left circular). The exact orientation of a particular antenna of the present technology can vary anywhere between purely horizontal and purely vertical (and any angle therebetween) as long as the antennas, which are adjacent to this particular antenna, are broadcasting in a manner that is orthogonal thereto.

In a more detailed, but non-limiting example, antenna 110 transmits signals in area 130 in a right handed circular polarization pattern (primary polarization). Antenna 115 transmits signals in area 135 in a left handed circular polarization pattern (secondary and orthogonal polarization). Antenna 120 transmits signals in area 145 in a right handed circular polarization pattern, while antenna 125 transmits signals in area 140 in a right handed circular polarization pattern. It will be understood that polarization, both left handed and right handed occurs both in transmission modes and receive modes for the antennae. This example is merely provided for explaining a non-limiting way of implementing the present technology. Thus while the primary polarization in this example is right handed circularity and the secondary left handed circularity, it will be understood that other permutations can also likewise be utilized. To be sure, the antennas can be configured to broadcast, for example, vertically, horizontally, or in some instances using a slant 45° configuration, such as common 4G LTE systems. Again, the exact orientation of an antenna of the present technology can vary anywhere between purely horizontal and purely vertical (and any angle therebetween) as long as the antennas which are adjacent to this antenna are broadcasting in a manner that is orthogonal thereto.

Other arrangements and configurations of antennae are utilized, although it is advantageous that antennas in a MIMO system can alternate in their polarity with respect to their right-handedness and left-handedness or vertical and horizontal polarity. For example, if an antenna is right handed in its polarization, adjacent antennae, such as antennae that broadcast in adjacent sectors is left handed in their polarization.

Again, each antenna (or a plurality thereof) is vertically polarized or horizontally polarized. The patterns are made tighter (e.g., more directionally focused) in a horizontal direction. However, overlapping the patterns slightly allows for signal pickup from two adjacent sides at locations relatively close to the access point. Such overlapping accomplishes a 2×2 MIMO connection if the signals from the adjacent sides are different polarizations relative to one another. An exemplary overlapping configuration to accomplish a 2×2 MIMO comprises a vertical-horizontal-vertical-horizontal arrangement of antennae around the 360 configuration.

Figure 3A:
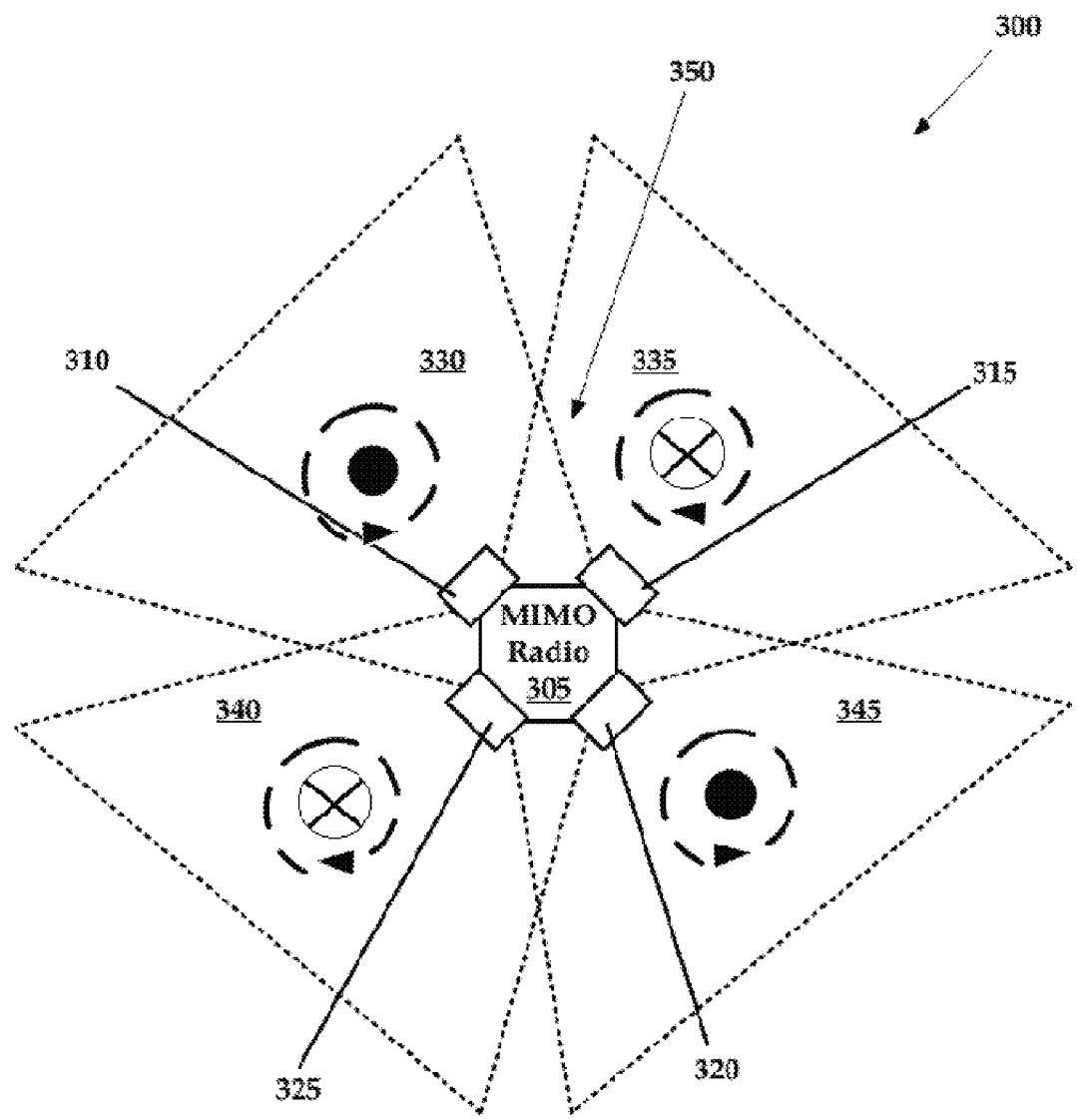
FIG. 3A is a schematic diagram of another exemplary MIMO system that is constructed in accordance with the present technology, having adjacent antennas that have broadcast patterns that at least partially overlap.

For example, FIG. 3A illustrates an exemplary MIMO system 300 that comprises a plurality of circularly polarized antennas 310-325, where antenna broadcasts in a fixed direction over a coverage area. The sub-sectors over which adjacent antennas broadcast and/or receive at least partially overlap. For example, overlap 350 shows an area of overlapping broadcast patterns between individual sub-sectors. Antennas 310 and 320 are left handed polarized, while antennas 315 and 325 are right handed polarized.

The plurality of circularly polarized antennas 310-325 are coupled electrically and communicatively to a MIMO radio 305. The MIMO radio 305 controls the transmission and/or receiver scheduling for each of the plurality of circularly polarized antennas 310-325, as well as the data that is transmitted. In some embodiments, antenna 310 broadcasts in area 330, antenna 315 broadcasts in area 335, antenna 320 broadcasts in area 340, and antenna 325 broadcasts in area 345. An area is also referred to as a sub-sector of the entire coverage area for the MIMO system 300.

Antenna 310 broadcast area overlaps the broadcast areas 335 and 340 of adjacent antennas. As mentioned above, this overlap of signal area allows for MIMO signal transmission/receipt. It will be understood that the term "broadcast" as a modifier, is understood to be a "coverage" inasmuch as the antennas both broadcast and receive within a "broadcast area", as controlled by the MIMO radio 305. Thus, a "broadcast area" should be understood as an area that allows for both transmission and receiving of signals, not just transmission or receiving along, although in some embodiments, antennas is dedicated to either transmitting or receiving signals only.

In general, the MIMO radio is configured to control antenna 310 such that it transmits signals using a primary polarization, while antenna 315 transmits signals using a secondary polarization. Antenna 320 transmits signals using the primary polarization and antenna 325 transmits signals using the secondary polarization. Advantageously, the adjacent antennae coupled to the MIMO radio alternate in their polarization, using either a primary or secondary polarization.

In accordance with the present disclosure, antenna 310 transmits signals in area 330 in a left handed circular polarization pattern. Antenna 315 transmits signals in area 335 in a right handed circular polarization pattern. Antenna 320 transmits signals in area 345 in a left handed circular polarization pattern, while antenna 325 transmits signals in area 340 in a right handed circular polarization pattern. It will be understood that polarization, both left handed and right handed occurs both in transmission modes and receive modes for the antennae.

Such a configuration allows radiation in full power extent as permitted by local regulations. For example, under FCC regulations, 47 CFR 15.407 limits the amount of effective isotropic radiated power (EIRP) per polarization orientation for unlicensed radiators. The Unlicensed National Information Infrastructure (U-NII), the upper range (U-NII-3), allows 53 dBm EIRP per polarization in point-to-point applications. In point-to-multipoint applications, U-NII-3 allows 36 dBm EIRP per polarization.

Circular polarization diversity in both transmission and reception, as described above (e.g., RHCP-LHCP-RHCP-LHCP or other similar arrangements), allows for flooding all the polarizations through use of reverse polarization. The flooding provides additional power, for example, 3 dB (or another value) of power. The EIRP appears constant and in some embodiments double the power is achieved.

Figure 2:
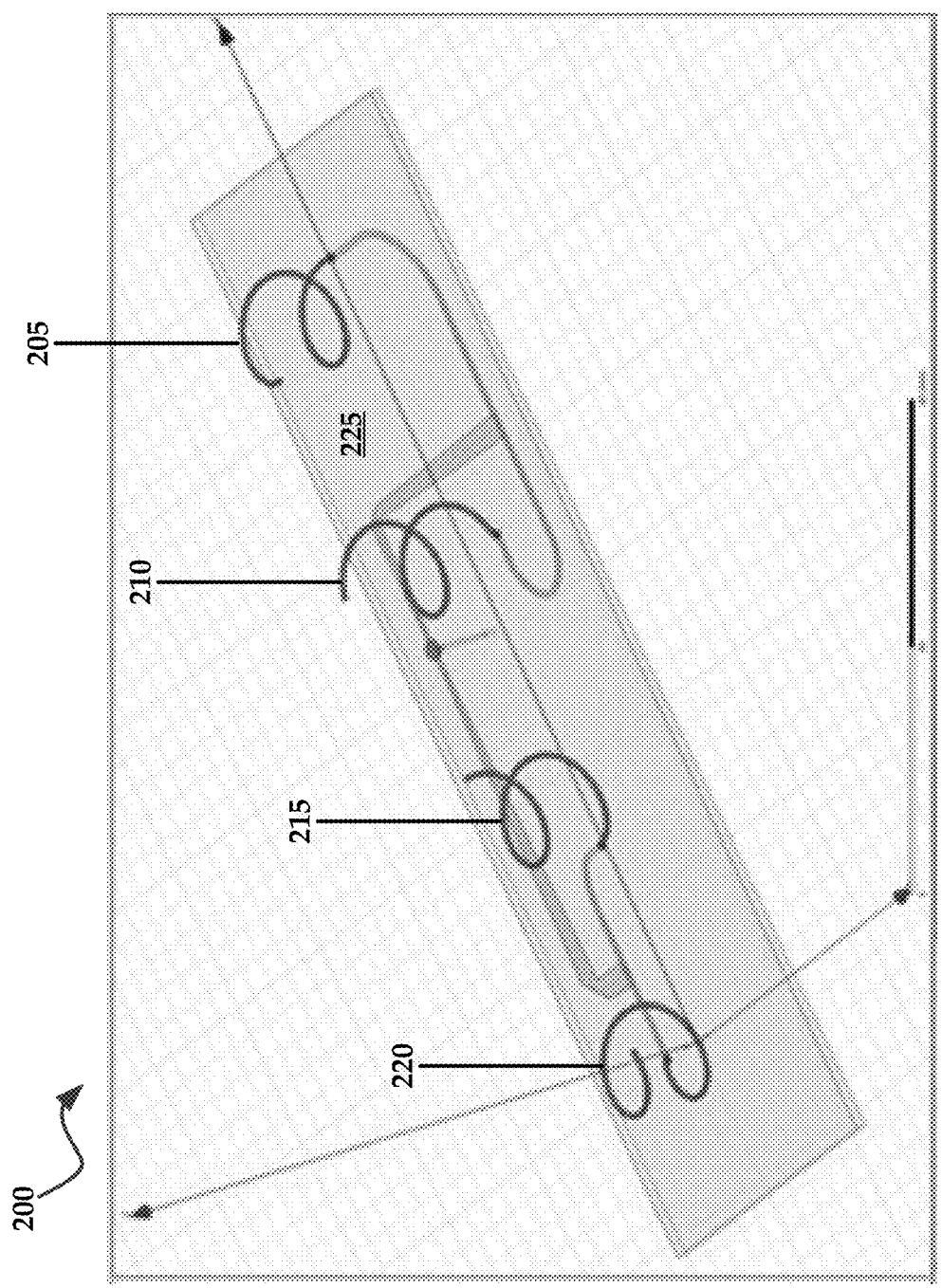
FIG. 2 is a perspective view of a linear array of antennas that can be utilized with an exemplary MIMO system that is constructed in accordance with the present technology.

FIG. 2 illustrates an exemplary array 200 that includes four elements 205-220 that are arranged onto a substrate 225. The elements 205-220 are shown as being clocked at 90 degrees relative to one another, but these elements need not be clocked and only arranged so as to allow for alternating right handed and left handed polarization. While the example provided above contemplates the use of four elements, it will be understood that any number of elements is utilized.

Figure 3B:
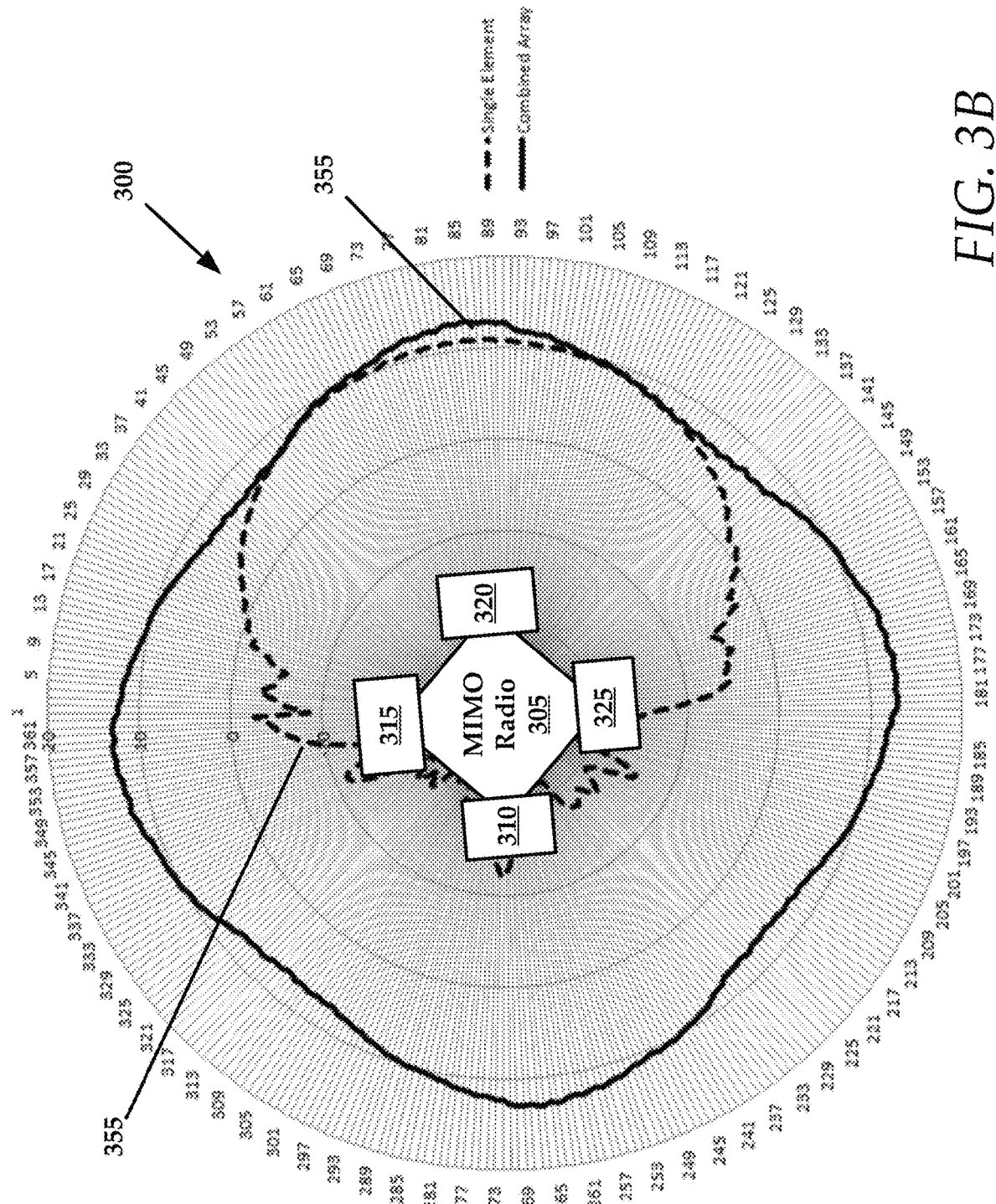
FIG. 3B illustrates a broadcast pattern generated by the exemplary MIMO system of FIG. 3A.

FIG. 3B illustrates a broadcast pattern 355 that is created, for example, by the MIMO system 300 of FIG. 3A. That is, the MIMO radio and its plurality of circularly polarized antennas 310-325 create the broadcast pattern 355. The broadcast pattern 355 of the combined effort of antennas 310-325 is illustrated in contrast with the more irregular broadcast pattern 360 of a single element antenna (not shown).

Figure 4:
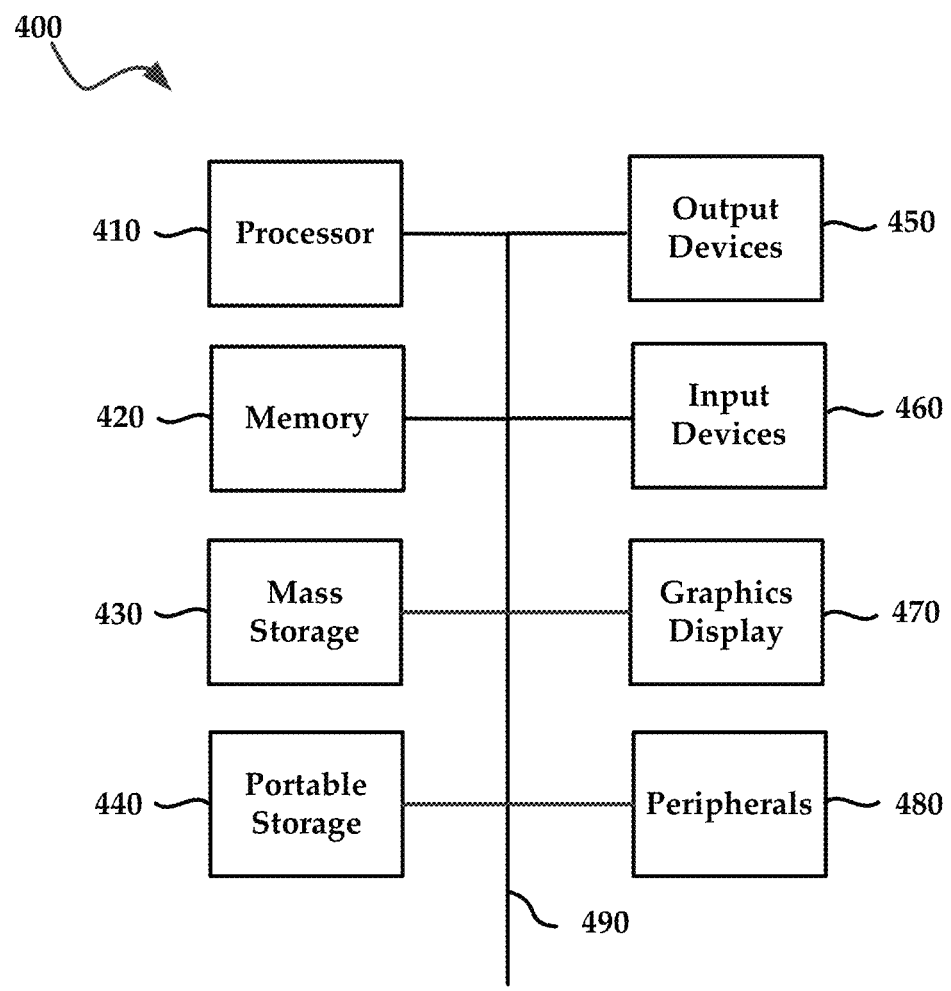
FIG. 4 illustrates an exemplary computing system that is used to implement embodiments according to the present technology.

FIG. 4 illustrates an exemplary computing system 400 (also referenced as system 400) that is used to implement an embodiment of the present technology. The computing system 400 is implemented in, for example, the MIMO radios described above. The computing system 400 of FIG. 4 includes one or more processors 410 and memory 420. Main memory 420 stores, in part, instructions and data for execution by processor 410. Main memory 420 can store the executable code when the system 400 is in operation. The system 400 of FIG. 4 may further include a mass storage device 430, portable storage medium drive(s) 440, output devices 450, user input devices 460, a graphics display 470, and other peripheral devices 480.

The components shown in FIG. 4 are depicted as being connected via a single bus 490. The components are connected through one or more data transport means. Processor unit 410 and main memory 420 is connected via a local microprocessor bus, and the mass storage device 430, peripheral device(s) 480, portable storage device 440, and graphics display 470 is connected via one or more input/output (I/O) buses.

Mass storage device 430, which is implemented with a magnetic disk drive or an optical disk drive, is a non-volatile storage device for storing data and instructions for use by processor unit 410. Mass storage device 430 can store the system software for implementing embodiments of the present technology for purposes of loading that software into main memory 420.

Portable storage device 440 operates in conjunction with a portable non-volatile storage medium, such as a floppy disk, compact disk or digital video disc, to input and output data and code to and from the computing system 400 of FIG. 4. The system software for implementing embodiments of the present technology is stored on such a portable medium and input to the computing system 400 via the portable storage device 440.

Input devices 460 provide a portion of a user interface. Input devices 460 may include an alphanumeric keypad, such as a keyboard, for inputting alphanumeric and other information, or a pointing device, such as a mouse, a trackball, stylus, or cursor direction keys. Additionally, the system 400 as shown in FIG. 4 includes output devices 450. Suitable output devices include speakers, printers, network interfaces, and monitors.

Graphics display 470 may include a liquid crystal display (LCD) or other suitable display device. Graphics display 470 receives textual and graphical information, and processes the information for output to the display device.

Peripherals 480 may include any type of computer support device to add additional functionality to the computing system. Peripheral device(s) 480 may include a modem or a router.

The components contained in the computing system 400 of FIG. 4 are those typically found in computing systems that is suitable for use with embodiments of the present technology and are intended to represent a broad category of such computer components that are well known in the art. Thus, the computing system 400 of FIG. 4 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions are composed of instructions that are stored on storage media (e.g., computer-readable medium). The instructions is retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media are involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present invention is written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer is connected to the user's computer through any type of network, including a local area network (LAN) or a wide area network (WAN), or the connection is made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions is provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While various embodiments have been described above, it should be understood that they have been presented by way of example only, and not limitation. The descriptions are not intended to limit the scope of the technology to the particular forms set forth herein. Thus, the breadth and scope of a preferred embodiment should not be limited by any of the above-described exemplary embodiments. It should be understood that the above description is illustrative and not restrictive. To the contrary, the present descriptions are intended to cover such alternatives, modifications, and equivalents as is included within the spirit and scope of the technology as defined by the appended claims and otherwise appreciated by one of ordinary skill in the art. The scope of the technology should, therefore, be determined not with reference to the above description, but instead should be determined with reference to the appended claims along with their full scope of equivalents.

What is claimed is:

1. A MIMO system comprising:
a radio; and
at least four antennas coupled to the radio, the at least four antennas servicing a broadcast area that has a 360 degree coverage area, wherein each of the at least four antennas transmits and receives in a sub-sector of the 360 degree coverage area, wherein a first of the at least four antennas transmits and receives signals in a first isolated sub-sector using a primary right-handed circular polarization and comprises a first angular orientation, a second of the at least four antennas transmits and receives signals in a second isolated sub-sector using a secondary left-handed circular orthogonal polarization and has a second angular orientation, a third of the at least four antennas transmits and receives signals in a third isolated sub-sector using the primary right-handed circular polarization and has a third angular orientation, and a fourth of the at least four antennas transmits and receives signals in a fourth isolated sub-sector using the secondary left-handed circular orthogonal polarization and has a fourth angular orientation, wherein the first angular orientation and the second angular orientation are selected to allow the first and the second of the at least four antennas to broadcast orthogonally relative to one another, wherein the at least four antennas are capable of providing circular polarization diversity in both transmission and reception allowing the radio to flood all polarizations using reverse polarization to provide additional power, and wherein the first and third of the at least four antennas are disposed 180 degrees out of phase relative to one another and the second and fourth of the at least four antennas are disposed 180 degrees out of phase relative to one another.

2. The MIMO system according to claim 1, wherein the first, second, third, and fourth isolated sub-sectors each occupy approximately 90 degrees of the 360 degree coverage area.

3. The MIMO system according to claim 1, wherein the additional power is approximately double.

* * * * *